United States Patent [19]
van Lookeren-Campagne et al.

[11] Patent Number: 4,797,366
[45] Date of Patent: Jan. 10, 1989

[54] GAS TREATMENT AND RESIN REGENERATION PROCESS

[75] Inventors: Constant J. van Lookeren-Campagne, Woking; Edward D. A. Obeng, Cobham, both of England

[73] Assignee: Shell Oil Company, Houston, Tex.

[21] Appl. No.: 12,454

[22] Filed: Feb. 9, 1987

[30] Foreign Application Priority Data

Feb. 17, 1986 [GB] United Kingdom ............... 8603842

[51] Int. Cl.$^4$ .................. D06M 16/00; A61L 9/01
[52] U.S. Cl. ..................................... 435/264; 435/266
[58] Field of Search .............................. 435/264, 266

[56] References Cited

U.S. PATENT DOCUMENTS 4,690,894 9/1987 Brierley et al. .................. 435/264

FOREIGN PATENT DOCUMENTS 3300402 10/1984 Fed. Rep. of Germany .
2512051 3/1983 France .
58-52488 9/1983 Japan .

OTHER PUBLICATIONS

Lobanova et al., *Zh. Prikl. Khim.* (Leningrad), 1982, 55(10), pp. 2333–2335.

*Primary Examiner*—Sam Rosen

[57] ABSTRACT

The invention provides a process for the removal of hydrogen sulphide from contaminated gas which comprises treating the gas with a cation exchange resin doped with ions of a metal selected from magnesium, calcium, vanadium, chromium, manganese, iron, cobalt, nickel, copper, zinc, cadmium and lead, and regenerating the resin by treatment thereof with an oxidizing microorganism.

7 Claims, No Drawings

GAS TREATMENT AND RESIN REGENERATION PROCESS

This invention relates to a gas treatment process, and more particularly to a process for the removal of hydrogen sulphide ($H_2S$) from contaminated gas.

Natural gas is frequently contaminated with $H_2S$, particularly where the gas-bearing rock formation contains sulphates and where sulphate-reducing bacteria have entered the formation in water which is used as displacement fluid. $H_2S$ has an objectionable smell, is toxic and produces oxides of sulphur on combustion. These factors lead purchasers not infrequently to refuse to accept gas supplies where $H_2S$ is present at more than 5 ppm (parts per million).

In traditional gas-sweetening processes, $H_2S$ is removed for example by use of solid zinc oxide. Although zinc oxide can be regenerated, such regeneration typically involves heating at temperatures of the order of 500° C., with formation of sulphur dioxide.

Various proposals have been made for replacement of such traditional gas-sweetening processes.

Thus Japanese published Patent Application No. 58-152488 discloses a process wherein gas contaminated with $H_2S$ is desulfurised by an aqueous solution containing ferric sulphate. The ferric sulphate is converted to ferrous sulphate and sulphuric acid, and sulphur is precipitated. The ferric sulphate is regenerated by treating the ferrous sulphate with ferrooxidans bacteria, e.g. *Thiobaccillus ferrooxidans*.

W. German Offenlegungsschrift DE-A-3300402 discloses a process wherein gas containing $H_2S$ is brought into contact with an aqueous solution of a heavy metal salt, e.g. a copper salt, and the metal sulphide which precipitates out is oxidised to sulphate by treatment with a sulphide-oxidising microorganism, e.g. *Thiobaccillus ferrooxidans*.

French Patent Application publication No. 2512051 discloses ion exchange resins, e.g. sulphonated styrene/divinylbenzene copolymers, containing at least one element of Group IIB of the Periodic Table of the Elements, e.g. zinc or cadmium, and use of such resins in desulphurisation of hydrocarbons. The examples given are of liquid-phase desulphurisation of a hydrocarbon mixture of boiling range 70° to 17520 C. and density 0.73 kg/l contaminated primarily with mercaptans and thioethers, using a sulphonated styrene/divinylbenzene copolymer doped in one case with zinc ions and in another case with cadmium ions.

G.A. Lobanova et al, Zh. Prikl. Khim. (Leningrad), 1982, 55(10), 2333–5, mentions various cation exchange resins in metallic form, e.g. containing copper, potassium, cobalt, silver, and specifically discloses the use of a sulphonic acid cation resin doped with heavy metal ions, specifically, iron, cadmium, zinc, cobalt and manganese in purification of gases from hydrogen sulphide (and other organosulphur compounds), by passing contaminated gas through a column filled with the appropriate doped resin. A method of regenerating the (spent) resin is disclosed. In this method, 0.5 molar aqueous hydrochloric acid is passed through the spent resin. The resulting solution is heated to remove $H_2S$ (and other organosulphur compounds), neutralised to pH6, and finally passed back through the column (to enable the metal ions to be reabsorbed by the resin from the solution). This process has the disadvantage that although the $H_2S$ is removed from the gas, there remains the problem of disposing of the $H_2S$.

There is a need for a process for removal of $H_2S$ from contaminated gas wherein the removal means is readily regenerated, and the removed $H_2S$ is oxidised e.g. to elemental sulphur or to sulphate ions.

According to the present invention there is provided a process for the removal of hydrogen sulphide from contaminated gas which comprises treating the gas with a cation exchange resin doped with ions of a metal selected from magnesium, calcium, vanadium, chromium, manganese, iron, cobalt, nickel, copper, zinc, cadmium and lead, and regenerating the resin by treatment thereof with an oxidising microorganism.

Cation exchange resins may typically have a polystyrene, phenolic or acrylic resin matrix with sulphonic, phosphonic or carboxylic acid groups as the active groups.

Typical carboxylic acid cation exchange resins are cross-linked polyacrylic-divinylbenzene resins, the active group being —$COO^-$, e.g. those sold by Rohm & Haas under the trade marks "Amberlite IRC-50" and "Amberlite CG-50" and those sold by Duolite International under the trade marks "Duolite C436", "Duolite 436" and "Zerolit 436".

Preferably the resin is a sulphonic acid cation exchange resin. Typical such resins are cross-linked polystyrene-divinylbenzene resins (generally 8 to 12%w divinylbenzene), the active group being —$SO_3^-$, e.g. those sold by Rohm & Haas under the trade marks "Amberlite IR-120" and "Amberlite CG-120", those sold by Dow Chemical Company under the trade marks "Dowex 50-X8" and "Dowex 50W-X8" and those sold by Duolite International under the trade marks "Duolite C225", "Duolite C255", "Duolite C26C", "Zerolit 225" and "Zerolit 625".

Although the above resins are typically available in particulate form, e.g. of particle size (mesh) 0.295 to 1.2 mm, it is envisaged that for large-scale operation of the process, the resin could advantageously be made in the form of Raschig rings or saddle shapes.

The resin may conveniently be doped with the metal ions either by soaking a quantity of resin in an aqueous solution of a water soluble salt of the metal, which, depending upon the specific metal selected, may conveniently be a sulphate, chloride, nitrate or acetate, or by passing such a solution through a column or bed of the resin.

It is preferred for the ions to be ferric, copper or zinc ions, in which case ferric sulphate, copper sulphate and zinc sulphate may very conveniently be used for the doping of the resin.

Regeneration of the resin will generally be effected at a temperature in the range 10° to 70° C., preferably 25° to 68° C., e.g. 30° to 40° C., the optimum temperature range being dependent upon the oxidising microorganism selected. Similarly, regeneration will generally be effected at a pH in the range 1 to 9, preferably 1.5 to 8, optimum pH being dependent upon the microorganism selected.

Examples of genera of oxidising microorganisms are Sulfolobus, Thiobacillus and Thiosphaera. Conveniently the oxidising microorganism is of the genus Thiobaccillus or Thiosphaera.

Advantageously the oxidising microorganism is *Thiobaccillus ferrooxidans* (e.g. ATCC 13598, ATCC 19859 and ATCC 21834) or *Thiosphaera pantotropha* (e.g. ATCC 35512).

The process of the invention has been found to be unaffected by the presence of carbon dioxide in the contaminated gas. Indeed, if desired the process can be employed for the removal of hydrogen sulphide from contaminated carbon dioxide.

The invention will be further understood from the following examples.

EXAMPLE 1

Use of ion exchange resin doped with ferric ions for $H_2S$ absorption 5 ml of "DUOLITE C 225" (trademark) ion exchange resin (a strongly acidic cation exchange resin of sulphonated cross-linked polystyrene-divinylbenzene (8% cross-linked), mesh size 0.295 mm to 1.2 mm, having exchange capacity of 4.8 meq/g (dry material) and 2.0 meq/ml (wet material)) was first soaked in 30 ml distilled water, the water was poured off and the wet resin was allowed to soak in 21 ml of a 7.9 g/l aqueous solution of ferric sulphate for 1 hour, at ambient temperature (20° C.). The resin, doped with ferric ions (84 mg), was then filtered off (0.8 μm filter), washed with 80 ml distilled water and drained.

The doped resin was transferred to a conical flask (volume 126 ml) and sealed under an atmosphere of 50% v/v $H_2S$ in air (ambient temperature, 20° C., and pressure, $1.013 \times 10^5$ Pa). After 16 hours, analysis of the gas phase showed that 61 mg of $H_2S$ had been absorbed. The doped resin was removed and washed for 1 hour with carbon disulphide (15 ml) to remove elemental sulphur. Removal and evaporation of the carbon disulphide yielded 4.3 mg elemental sulphur.

*Thiobacillus ferrooxidans* (ATCC 13598) was grown aerobically at 32° C. and pH 1.8 in an aqueous medium containing the following components:

|  | g/l |
| --- | --- |
| $FeSO_4.7H_2O$ | 125 |
| $(NH_4)_2SO_4$ | 0.25 |
| $MgSO_4.7H_2O$ | 0.125 |
| $Ca(NO_3)_2.4H_2O$ | 0.0375 |
| $H_3PO_4$ | 0.1 |
| $H_2SO_4$ | 0.82 |
| trace elements solution | 2.5 |

The trace elements solution was an aqueous solution having the following composition:

|  | g/l |
| --- | --- |
| $CaCl_2.2H_2O$ | 0.66 |
| $ZnSO_4.7H_2O$ | 0.18 |
| $CuSO_4.5H_2O$ | 0.16 |
| $MnSO_4.4H_2O$ | 0.15 |
| $CoCl_2.6H_2O$ | 0.18 |
| $H_3BO_3$ | 0.10 |
| $Na_2MoO_4.2H_2O$ | 0.30 |

When the *Thiobaccillus ferrooxidans* had reached a cell concentration of 8 g (dry weight)/l, at which stage the concentration of ferric ions was 4.69 g/l, 40 ml thereof was added to the washed, doped resin in the conical flask and the resulting mixture was stirred for 300 hours at 32° C. The regenerated resin was filtered off and washed with water, and was found to be doped with 180 mg of ferric ions.

The regenerated resin was sealed in the conical flask for 20 hours under a $H_2S$-containing atmosphere, as described above, and subsequent analysis showed that 89 mg of $H_2S$ had been absorbed. On washing with carbon disulphide, 23 mg elemental sulphur was recovered.

$H_2S$ capture by the original doped resin was calculated to be 0.464 mol $H_2S$ per mol ferric ions, and that by the regenerated resin was 0.475 mol $H_2S$ per mol ferric ions (c.f. theoretical value 0.5 mol/mol).

EXAMPLE 2

Use of ion exchange resin doped with copper ions for $H_2S$ absorption 5 ml of "DUOLITE C225" (trade mark) ion exchange resin was soaked in 50 ml of a 0.1 molar aqueous solution of copper sulphate for 1 hour, at ambient temperature (20° C.). The resin, doped with copper (i.e. cupric) ions (194 mg), was then filtered off, washed with 80 ml 0.05 molar sulphuric acid and drained.

The doped resin was used for $H_2S$ absorption as described in Example 1. After 16 hours, 89.5 mg of $H_2S$ had been absorbed.

*Thiosphaera pantotropha* (ATCC 35512, which is the strain described by L. A. Robertson and J. G. Kuenen, J. Gen. Microbiol. (1983), 129, 2847-2855) was grown aerobically at 37° C. and pH 8.0 in a continuous culture at a dilution rate of 0.1 per hour in an aqueous medium containing the following components:

|  | g/l |
| --- | --- |
| $Na_2HPO_4.7H_2O$ | 7.9 |
| $KH_2PO_4$ | 1.5 |
| $NH_4Cl$ | 0.3 |
| $MgSO_4.7H_2O$ | 0.1 |
| sodium acetate | 0.3 |
| $Na_2S_2O_3.5H_2O$ | 0.25 |
| $KNO_3$ | 0.2 |
| trace elements solution | 2 |

The pH of the medium was adjusted to 8.0 by use of 1 molar aqueous sodium hydroxide solution.

The trace elements solution was an aqueous solution having the following composition:

|  | g/l |
| --- | --- |
| ethylenediaminetetraacetic acid | 500 |
| $ZnSO_4$ | 2.2 |
| $CaCl_2$ | 5.54 |
| $MnCl_2$ | 5.06 |
| $FeSO_4$ | 4.99 |
| ammonium molybdate | 1.10 |
| $CuSO_4$ | 1.57 |
| $CoCl_2$ | 1.61 |

A sample of the *Thiosphaera pantotropha* culture was concentrated by ultrafiltration to a concentration of 10 g (dry weight of cells)/l, and 500 ml thereof was placed in a 1 liter stirred tank fermenter at 37° C. and pH 8. The doped resin was removed from the conical flask and placed in the fermenter. The resulting mixture was stirred (1000 rpm) and air (800 ml/minute) and nitrogen (200 ml/minute) were passed in for 50 hours. The regenerated resin was then filtered off, washed with water and drained.

The regenerated resin was sealed in the conical flask under a $H_2S$-containing atmosphere as described above. After 16 hours, 74 mg of $H_2S$ had been absorbed.

$H_2S$ capture by the original doped resin was calculated to be 0.87 mol $H_2S$ per mol cupric ions, and that by the regenerated resin was 0.72 mol $H_2S$ per mol cupric ions (c.f. theoretical value 1). The regeneration efficiency was thus 83%.

EXAMPLE 3

Use of ion exchange resin doped with zinc ions for $H_2S$ absorption

The procedure of Example 2 was repeated except that, in place of the 0.1 molar copper sulphate solution, there was used a 0.1 molar zinc sulphate solution.

$H_2S$ capture by the zinc doped resin found to be 0.68 mol $H_2S$ per mol zinc ions, and that by the regenerated resin was 0.60 mol $H_2S$ per mol zinc ions, the regeneration efficiency therefore being 88%.

EXAMPLE 4

Absorption of $H_2S$ from a gas stream using ion exchange resin doped with copper ions 14 ml of "DUOLITE C225" (trade mark) ion exchange resin was soaked in 150 ml of a 0.1 molar aqueous copper sulphate solution for 1 hour, at ambient temperature (20° C.). The resulting doped resin was filtered off and packed into a fixed bed glass column (1.2 cm internal diameter) having a glassfibre wool plug at one end. The other end of the column was plugged with glassfibre wool.

The column (internal length occupied by resin was 12.3 cm) was washed through with 100 ml 0.05 molar sulphuric acid, allowed to drain and dried by passing air through for 5 minutes. One end of the column (the inlet end) was then connected to a supply of $H_2S$-contaminated gas in the form of 1% v/v $H_2S$ in nitrogen. The outflow from the other end of the column (the outlet end) was monitored for $H_2S$ content by being passed to a "NEOTRONICS HS 102" (trade mark) $H_2S$ monitor.

The gas was passed through the column at a flow rate of 500 ml/minute. $H_2S$ levels in the outflow remained below 1 ppm for 100 seconds, following which a rapid rise in $H_2S$ content to above 400 ppm occurred (breakthrough). By 100 seconds, the column had absorbed 12.6 mg $H_2S$. The original colour of the doped resin was green, and that of the spent resin was black. Visual monitoring of the resin showed that a black zone formed initially at the inlet end and spread uniformly along the column towards the outlet end, the whole length of the column being black at 100 seconds.

The above procedure was repeated using different flow rates of the 1% v/v $H_2S$ in nitrogen. At a rate of 19 ml/minute, $H_2S$ levels in the outflow remained below 1 ppm (at substantially zero) for 810 seconds, before breakthrough occurred. At a rate of 99 ml/minute, $H_2S$ levels in the outflow remained below 1 ppm for 360 seconds before breakthrough occurred. At a rate of 1060 ml/minute, $H_2S$ levels in the outflow remained below 2 ppm for 28 seconds, before breakthrough occurred.

EXAMPLE 5

Absorption of $H_2S$ from a gas stream using ion exchange resin doped with copper ions 25 ml of "DUOLITE C225" (trade mark) ion exchange resin was soaked in 450 ml of a 0.1 molar aqueous copper sulphate solution for 1 hour, at ambient temperature (20° C.). The resulting doped resin was filtered off and packed into a fixed bed glass column (1.2 cm internal diameter) having a glassfibre wool plug at one end. The other end of the column was plugged with glassfibre wool.

The column (internal length occupied by resin was 22 cm) was washed through with 50 ml water, allowed to drain and dried by passing air through for 5 minutes. One end of the column (the inlet end) was then connected to a supply of $H_2S$-contaminated gas in the form of 1010 ppm $H_2S$ in nitrogen. The outflow from the other end of the column (the outlet end) was monitored for $H_2S$ content by being passed to a "NEOTRONICS HS 102" (trade mark) $H_2S$ monitor.

The gas was passed through the column at a flow rate of 300 ml/minute. $H_2S$ levels in the outflow remained below 1 ppm for 610 minutes, following which a rapid rise in $H_2S$ content to above 400 ppm occurred (breakthrough). By 610 minutes, the column had absorbed 332 mg $H_2S$ (equivalent to 12.5 Kg sulphur/cubic metre of bed). The original colour of the doped resin was green, and that of the spent resin was black. Visual monitoring of the resin showed that a black zone formed initially at the inlet end and spread uniformly along the column towards the outlet end, the whole length of the column being black at 610 minutes.

The above procedure was repeated using 1000 ppm $H_2S$ in carbon dioxide. Breakthrough occurred after substantially the same time (600 minutes) and carbon dioxide had no effect on $H_2S$ removal. Those skilled in the art will appreciate that the experiments of Examples 4 and 5 could be repeated using the ferric-doped resin of Example 1 or the zinc-doped resin of Example 3 and that comparable results would be obtained.

Although regeneration of spent resin from a column as used in Examples 4 and 5 can be done on a batch basis by removal of the resin from the column and treatment with a suitable microorganism, according to Example 1, 2 or 3, those skilled in the art will be alert to the possibility of in situ regeneration by passing a suitable fermentation broth through the column. Temperature control for such regeneration can be achieved for example by provision of a water jacket around the column.

For continuous removal of $H_2S$ from substantial streams of gas, large columns of doped resin will be required. Provision of a plurality of columns enables switching of the gas stream from one column to another as the doped resin in the one column is spent, and thus enables regeneration of the spent resin to be effected without the need to shut off the gas stream.

In cases where the microbiological regeneration efficiency (c.f. Examples 2 and 3) is less than 100%, it will be advantageous to follow the regeneration by effecting redoping, e.g. in the case of copper or zinc-doped resin by soaking the regenerated resin in an aqueous solution of copper or zinc sulphate, as appropriate. In the case of a column such as that used in Example 4, this may conveniently be achieved by passing the solution through the column after in situ regeneration.

I claim:

1. A process for the removal of hydrogen sulphide from contaminated gas which comprises treating the gas with a cation exchange resin doped with ions of a metal selected from magnesium, calcium, vanadium, chromium, manganese, iron, cobalt, nickel, copper, zinc, cadmium and lead, and regenerating the resin by treatment thereof with an oxidising microorganism.

2. A process according to claim 1 wherein the resin is a sulphonic acid cation exchange resin.

3. A process according to claim 1 or 2 wherein the ions are ferric, cupric or zinc ions.

4. A process according to claims 1 or 2 wherein regeneration of the resin is effected at a temperature in the range 25° to 40° C.

5. A process according to claims 1 or 2 wherein regeneration of the resin is effected at a pH in the range 1.5 to 8.

6. A process according to claims 1 or 2 wherein the oxiding microorganism is of the genus Thiobaccillus or Thiosphaera.

7. A process according to claims 1 or 2 wherein the oxidising microorganism is *Thiobaccillus ferrooxidans* or *Thiosphaera pantotropha*.

* * * * *